United States Patent Office 3,151,962
Patented Oct. 6, 1964

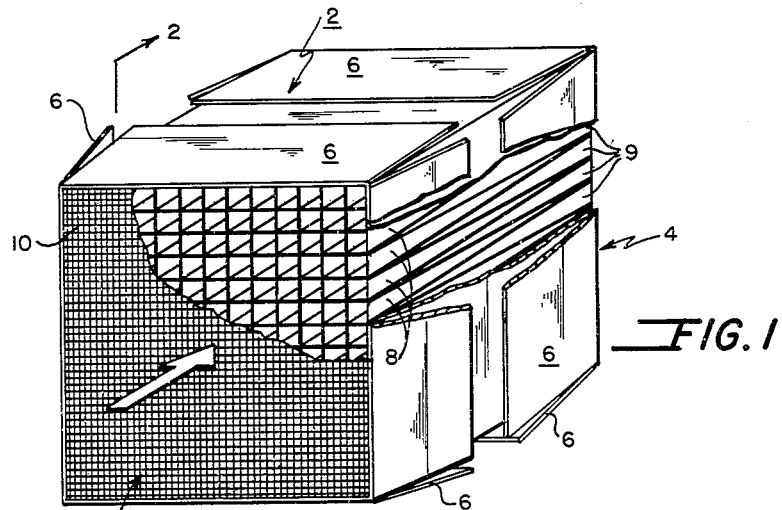
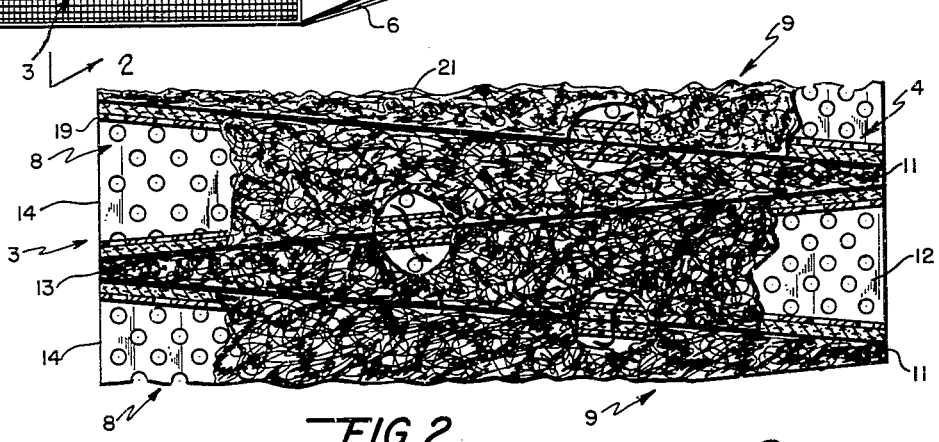
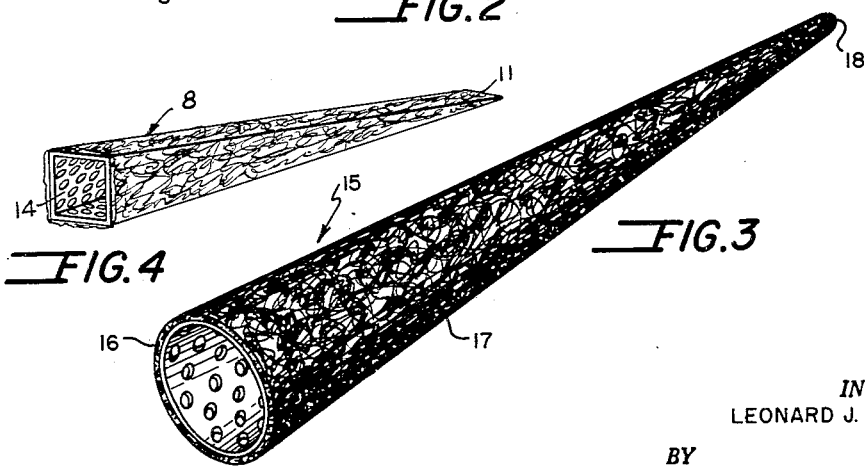

3,151,962
DISPOSABLE UNIT TYPE FLUID FILTER
Leonard J. O'Dell, Louisville, Ky., assignor to American Air Filter Company, Inc., Louisville, Ky., a corporation of Delaware
Filed Nov. 25, 1960, Ser. No. 71,740
4 Claims. (Cl. 55—350)

The present invention relates to filters and more particularly to fluid filters of the disposable unit type.

In accordance with the present invention a unit filter is provided which can be economically manufactured, shipped and installed and which also can be economically replaced after use because of low material and manufacturing costs. In addition, the present invention provides a unit filter which can efficiently filter large volumes of fluid, such as dust laden atmospheric air, presenting a maximum of filter area in a minimum of space and affording maximum upstream and downstream filter face areas in obtaining such results.

Various other features of the present invention will become obvious to one skilled in the art upon reading the disclosure set forth hereinafter.

More particularly, the present invention provides an apparatus for filtering a dirty fluid stream comprising an open-ended housing including spaced, opposed fluid inlet and fluid outlet faces, and a plurality of hollow, wedge-like filter members positioned within the housing to extend longitudinally between the spaced inlet and outlet faces, adjacent wedge-like filter members being arranged alternatively to provide a pair of intermeshing filter member sets with the filter member vertices of one set of the pair resting substantially in a plane determined by the filter member bases of the other set of the pair.

It is to be understood that various changes can be made by one skilled in the art in the arrangement, form and construction of the apparatus disclosed herein without departing from the scope or spirit of the present invention.

Referring to the drawing:

FIGURE 1 is a partially broken away isometric view of a unit filter which incorporates the features of the present invention in one advantageous embodiment of the invention;

FIGURE 2 is an enlarged, partially broken away, cross sectional view taken in a plane passing through line 2—2 of FIGURE 1, disclosing a portion of the filter members in the unit filter of FIGURE 1;

FIGURE 3 is a perspective view of still another advantageous embodiment of the present invention; and, FIGURE 4 is an isometric view of a hollow wedge-like member included in the structure of FIGURES 1 and 2.

As can be seen in FIGURE 1 of the drawing, filter housing 2 is in the form of an open-ended rectangular frame, presenting fluid stream inlet face 3 and spaced, opposed fluid stream outlet face 4. Housing 2 can be formed from any one of a number of suitable materials and advantageously, can be in the nature of a cardboard box including cover flaps 6 which can be closed over ends 3 and 4 for shipping and storage and which can be folded back during filter operations.

Positioned within housing 2 in stacked arrangement to extend longitudinally between spaced fluid pervious retaining screens 10 mounted across inlet and outlet faces 3 and 4 respectively is a pair of intermeshing sets of alternatively arranged hollow filter members 8 and 9. Filter members 8 and 9 are wedge-like in shape with closed vertices 11 of filter members 8 which form one set of a pair of filter member sets (FIGURE 2) resting substantially in a plane determined by opened bases 12 of filter members 9 which filter members form the other set of the pair of sets, the closed vertices 11 and the opened bases 12 falling along downstream face 4 of filter housing 2. In comparable manner, closed vertices 13 of filter members 9 of one set of the pair of sets rests substantially in a plane determined by opened bases 14 of filter members 8 of the other set of the set pair, closed vertices 13 and opened bases 14 falling along upstream face 3 of filter housing 2. It is to be noted that a sufficient number of filter members 8 and 9 are provided to completely fill housing 2 so as to insure full and complete filter treatment of fluid passing therethrough from inlet face 3 to outlet face 4.

In an advantageous embodiment of the invention disclosed, hollow wedge-like members 8 and 9 are of pyramidical form (FIGURE 1), the opened bases 12 and 14 of each being in the form of four-sided polygons and the four walls of each being such that one pair of opposite walls thereof are triangular in shape and the other pair of opposite walls are rectangular in shape (FIGURE 4). It is to be understood that other types of hollow, wedge-like filter members can be arranged in stacked position in housing 2. For example, the opened bases can be triangular or, as can be seen in FIGURE 3, hollow filter members such as at 15 can be used, such filter members each having an opened circular base 16 and a conical wall 17 terminating in a closed vertex 18.

The wedge-like filter members which are stacked in housing 2 can be made from any one or a number of combined materials known in the filtering art. Advantageously, and as disclosed, each of filter members 8, 9 can include perforated inner support layer 19, which can be of comparatively rigid material such as paper. Fastened to perforated support layer 19 by some suitable adhesive is a layer of denser fibrous filter material 21, such as that sold under assignee's registered trademark, "Filterdown," and which advantageously can be formed from glass or cotton fibers.

In fabricating filter members, such as 8 and 9, a sheet of perforated paper-like material can be spread on a flat surface, adhesive applied and then a sheet of denser fibrous filter material, fastened thereto, such as a sheet of continuous, interconnected and bonded glass fiber material or a sheet of cotton wadding material like that sold under applicant's trademark "Filterdown," Reg. No. 728,129. Once this has been accomplished, the finished product can be cut and formed into the proper wedge-like filter members. It is to be understood that instead of using a sheet of Filterdown material, the filter material can be in loose particle form and sprayed onto the perforated inner support sheet after the adhesive has been applied thereto. It also is possible to first form an inner layer of perforated support material, such as perforated paper, into separate wedge-like forms and then spray loose particles of finer filter material, such as glass or cotton fibers, onto such separate forms after an adhesive has been applied.

The invention claimed is:

1. Apparatus for filtering a dirty fluid stream comprising an open-ended disposable housing including spaced, opposed fluid inlet and fluid outlet faces, a plurality of tapered hollow wedge-like filter members positioned in vertically and horizontally stacked relationship within said housing in a pair of sets to extend longitudinally between said spaced inlet and outlet faces across the overall breadth and width of said housing, each of said filter members in each set including a body portion determined between a base end and a vertex end, the filter members of each set having the same orientation and the orientation of one set of said pair being reversed to that of the other set of said pair to provide intermeshing filter member sets with the filter member vertices of one set resting substantially in a plane determined by the filter member bases of the other set, and with the bases of one set serving as fluid inlets and the bases of the other set serving as fluid outlets, substantially all of the walls of the body portion of each of said wedge-like filter members being comprised of an inner support layer of perforated paper-like material and an outer layer of fine fibrous material.

2. The apparatus of claim 1, said inner layer of paper-like material having an adhesive coating on the outer surface thereof to hold said fibrous material, said fibrous material being in sheet form.

3. The apparatus of claim 1, said inner layer of paper-like material having an adhesive coating on the outer surface thereof to hold said fibrous material, said fibrous material being in sprayed, loose particle form.

4. Apparatus for filtering a dirty fluid stream comprising an open-ended disposable housing having spaced, opposed fluid inlet and fluid outlet faces and including removable cover flaps cooperating with said spaced faces, a plurality of tapered hollow wedge-like filter members positioned in vertically and horizontally stacked relationship within said housing in a pair of sets to extend longitudinally between said spaced inlet and outlet faces across the overall breadth and width of said housing, each of said filter members in each set including a body portion determined between a base end and a vertex end, the filter members of each set having the same orientation and the orientation of one set of said pair being reversed to that of the other set of said pair to provide intermeshing filter member sets with the filter member vertices of one set resting substantially in a plane determined by the filter member bases of the other set and with the bases of one set serving as fluid inlets and the bases of the other set serving as fluid outlets, substantially all of the walls of the body portion of each of said wedge-like filter members being comprised of disposable filter medium.

References Cited in the file of this patent

UNITED STATES PATENTS

| | | |
|---|---|---|
| 296,758 | Kutsche | Apr. 15, 1884 |
| 2,016,033 | Christofferson | Oct. 1, 1935 |
| 2,020,120 | Leathers | Nov. 5, 1935 |
| 2,130,806 | Link | Sept. 20, 1938 |
| 2,804,166 | Stevens et al. | Aug. 27, 1957 |
| 2,835,340 | McGuff et al. | May 20, 1958 |
| 2,964,127 | Korn | Dec. 13, 1960 |
| 3,026,967 | Stevens et al. | Mar. 27, 1962 |

FOREIGN PATENTS

| | | |
|---|---|---|
| 311,189 | Switzerland | Jan. 31, 1956 |
| 1,175,554 | France | Nov. 17, 1958 |
| 1,232,433 | France | Apr. 25, 1960 |